United States Patent [19]

Wu

[11] Patent Number: 5,213,375

[45] Date of Patent: May 25, 1993

[54] QUICK PIPE CONNECTOR

[76] Inventor: Huang H. Wu, No. 261, Guang Ming Rd., Sec. 2 Lw Jwu Shiang, Taur Yuan Hsien, Taiwan

[21] Appl. No.: 813,258

[22] Filed: Dec. 24, 1991

[51] Int. Cl.⁵ .............................................. F16L 35/00
[52] U.S. Cl. .................................... 285/38; 285/322; 285/348; 285/354; 285/906; 285/93
[58] Field of Search ............... 285/322, 323, 341, 354, 285/38, 348, 906, 93

[56] References Cited

U.S. PATENT DOCUMENTS 2,394,351  2/1946  Wurzburger ........................ 285/341
2,988,385  6/1961  Foelster et al. .................. 285/354 X
4,432,559  2/1984  Rasmussen ....................... 285/323 X
4,822,075  4/1989  Reaux ............................. 285/323 X

FOREIGN PATENT DOCUMENTS 2210123  6/1989  United Kingdom ................ 285/322

Primary Examiner—Dave W. Arola
Attorney, Agent, or Firm—W. Wayne Liauh

[57] ABSTRACT

A pipe connector comprises mainly a main body, a threaded cap, and a rubber washer. It is further provided therein with a circular bowlike curved flange and means to prevent leak. In the process of joining the connector with a pipe, the connection head is made to engage securely with pipe by means of tightening the threaded cap to engage the main body so as to press the circular bowlike flange to engage securely the pipe in a leakproof manner and in such a way that it prevents the connection head from disengaging the pipe under high pressure.

12 Claims, 4 Drawing Sheets

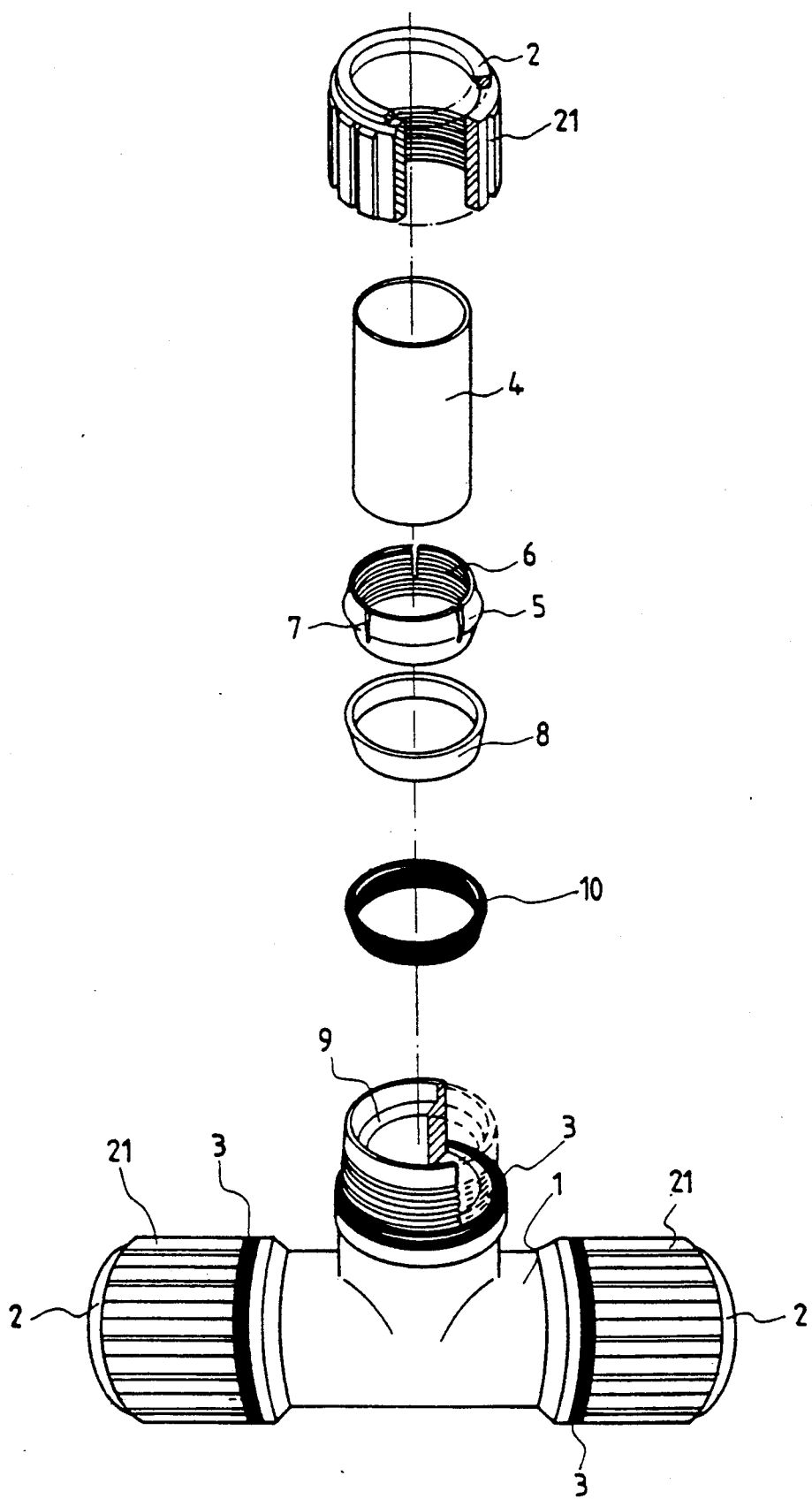
FIG · 3

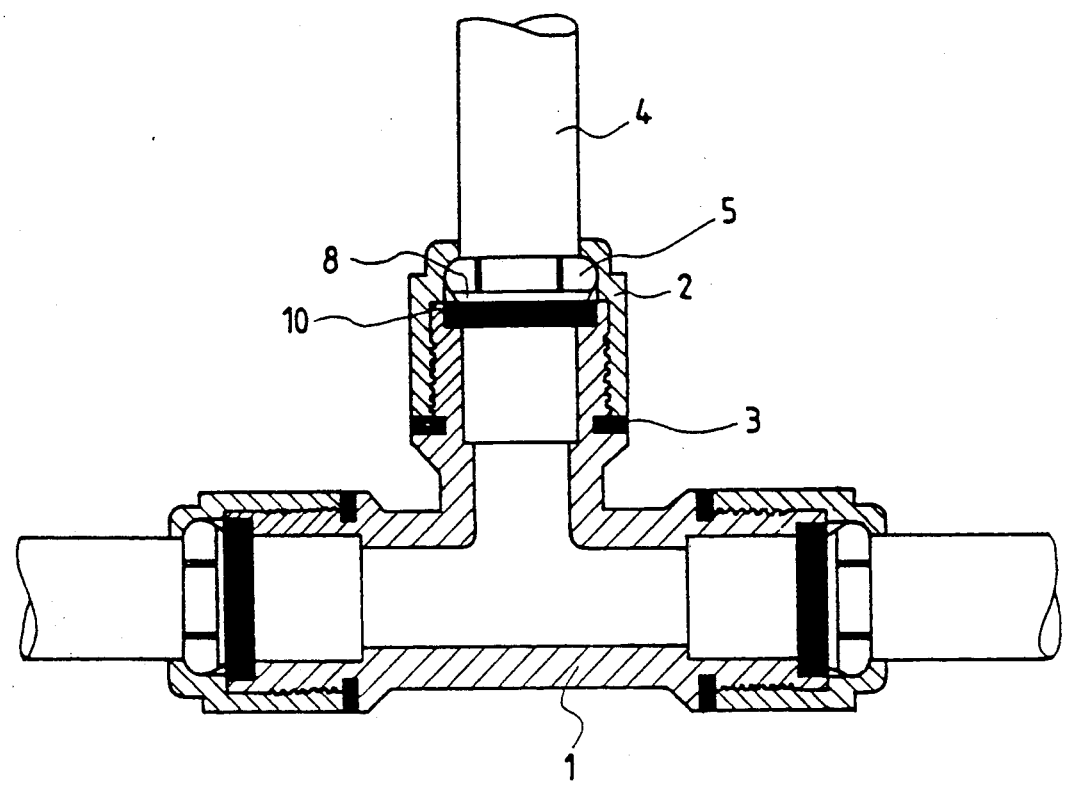
FIG · 5

QUICK PIPE CONNECTOR

BACKGROUND OF THE INVENTION

The present invention relates to a Quick Pipe Connector more particularly to an improved Quick Pipe Connector that can be screwed into a pipe rapidly.

It is a common occurrence in a construction project that a situation may develop to require the plumber to rearrange the pipes or the direction of flow. To serve such purposes, various connector of prior art are currently available in the market. Among the most commonly used connection heads of prior art are three-way connection head, L-shaped connection head, etc. Such connection heads of prior art are in general provided with packing, ferrule, and threaded cap. In addition, there are also expansion connectors and metal quick connectors. All of such prior art connectors of prior art share the following shortcomings:

1. The plumbers need a greater working space and special work tool such as pipe-expanding tool, connecting tool and/or welding tool to work with such prior art connector.
2. The ferrule has to be pressed to attain the form required to provide a tight seal, resulting in additional labor that is needed.
3. It is difficult to join the connector with a pipe in a leakproof manner. The use of metal washer is difficult to connect pipes in a leakproof manner.
4. The joined connector is vulnerable to disengagement under high pressure. The plastic washer often fails to sustain high pressure.
5. After being connected and/or welded, the joined connectors can not be used repeatedly.

SUMMARY OF THE INVENTION

It is therefore the primary objective of the present invention to provide a pipe connector, which is capable of being quickly connected to a pipe in a leakproof manner and in such a way that it is not vulnerable to disengagement under high pressure.

It is another objective of the present invention to provide a connector, which is capable of being quickly connected to a pipe with a minimum requirement of labor.

In keeping with the principles of the present invention, the primary objectives of the present invention are accomplished by a pipe connector comprising mainly a main body, a threaded cap, and a rubber washer. It is further provided therein with a sleeve having a circular bowlike contractible curved flange having an outermost diameter greater than the inner diameter of the threaded cap to prevent leak. In the process of connecting the connector of the present invention with a pipe, the connector is made to engage securely with pipe by means of tightening the threaded cap to press the sleeve having the circular bowlike contractible curved flange tightly against the pipe to thereby engage securely the pipe with the quick pipe connector of this invention in a leakproof manner and in such a way that the connector is free from being disengaged from the pipe under high pressure.

The foregoing objectives, functions, and features of the present invention will be better understood by studying the following detailed description of the preferred embodiment in conjunction with the drawings provided herewith.

BRIEF DESCRIPTION OF THE DRAWINGS

FIG. 3 shows an exploded view of internal structures of the present invention.

FIG. 5 shows a sectional view of the connection head in its entirety in combination according to the present invention.

DETAILED DESCRIPTION OF THE PREFERRED EMBODIMENT

Figure 1:
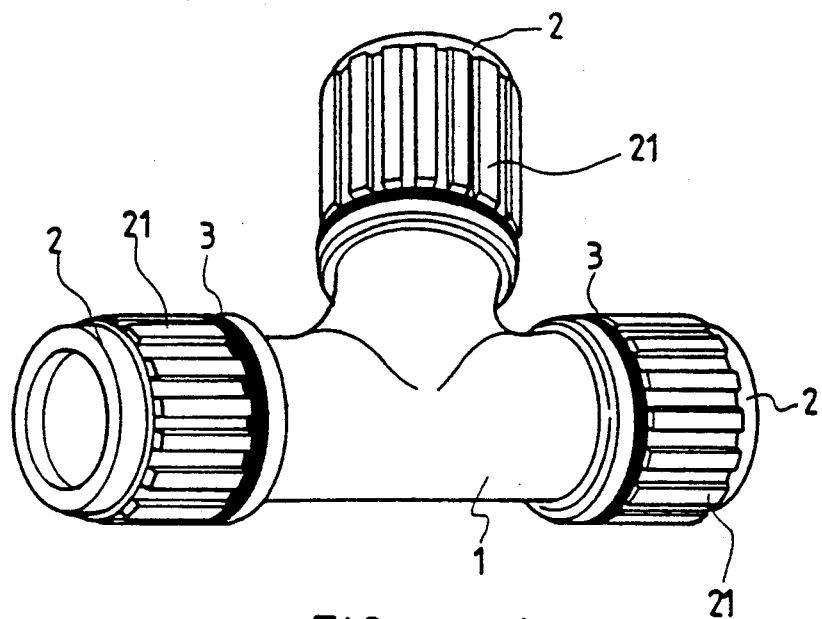
FIG. 1 shows a three-dimensional front view of the present invention.
Figure 2:
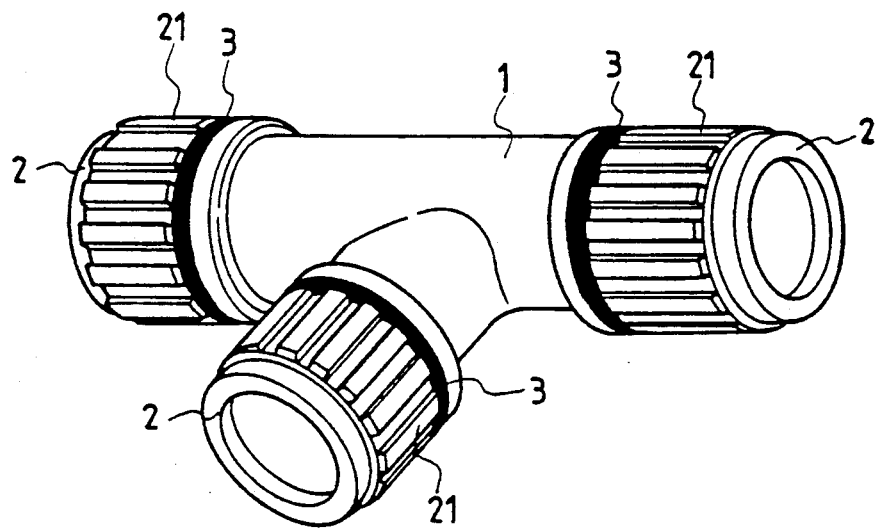
FIG. 2 shows a three-dimensional side view of the present invention.

Referring to FIGS. 1, 2 and 3, the connection head embodied in the present invention is shown comprising externally a main body 1, a threaded cap 2, and a rubber washer 3. The pipe 4 intended to be joined with the connection head of the present invention is inserted into the threaded cap 2, and in the meantime allow the threaded hole of the threaded cap 2 to engage securely the threaded outer wall of the main body 1. The plumber can tell easily if the main body 1 and the threaded cap 2 are properly tightened by means of observing a change in the color of the rubber washer 3 sandwiched between the main body 1 and the threaded cap 2 to serve as a sealer to prevent the connection head from leaking. Unlike the prior art threaded cap having the outer edge of acute angular construction, the threaded cap 2 of the present invention is provided with the parallel protruded strips 21 so designed to conform to the mechanical principles of human body. The protruded strips 21 serve to expand the area of the threaded cap 2 that is exerted on by the operating force. As a result, a plumber can easily maneuver to work on the threaded cap 2 in a relatively small space of 20 degrees as compared with a space of 80 degrees for the prior art threaded cap. Take a hexagonal case as an example, it takes at least the space of 80 degrees for the tool to rotate 20 degrees. In addition, the work tool that is needed to work on the connector of the present invention is a tightening device of ordinary kind. A special tool is not needed to work on the connector of the present invention.

Figure 4C:
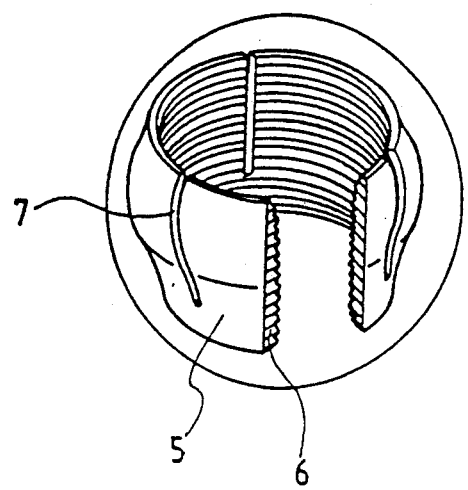
FIGS. 4A-4C show a schematic view of the combination of the present invention.
Figure 4A:
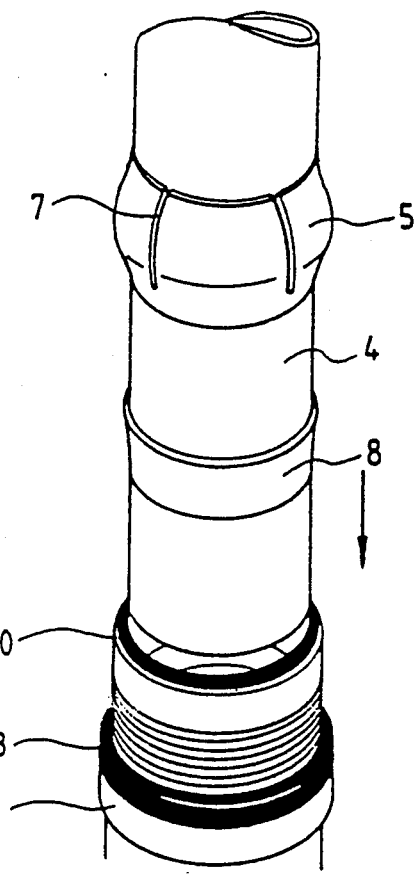
Figure 4B:
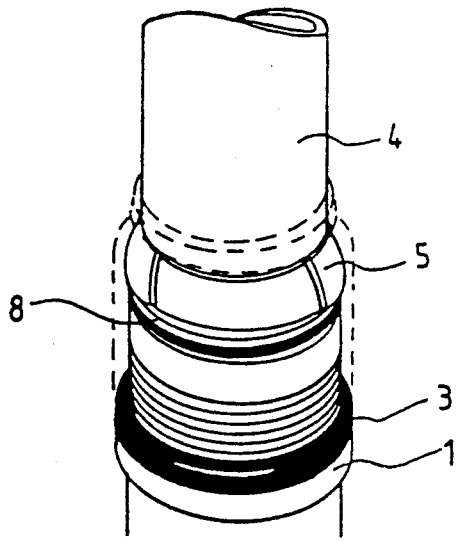

Now referring to FIGS. 3 and 4, a metal circular sleeve 5 with flange is shown to be sleeved over the pipe 4. As threaded cap 2 is tightened up, the inner thread 6 of the sleeve 5 engages securely the pipe 4 so that the pipe 4 is securely retained by the main body 1 of the connector to an extent that the pipe 4 and the main body 1 of the connector will not leak or disengage under the pressure up to 60 kgf/cm$^2$ according to the experiment. It is therefore apparent that the connector of the present invention is suitable for use in both situations where the pipes are either buried or exposed.

As shown in FIG. 4, the metal sleeve 5 has an upper middle portion with an outermost diameter greater than the inner diameter of the threaded cap 2. The metal sleeve is provided with a plurality of cleavages 7 allowing the metal sleeve to contract thereby become receivable by the threaded cap 2. Therefore, the metal sleeve 5 can serve as a sealer to prevent the fluid from leaking out of the pipe. In addition, the sleeve 5 is further provided with a metal bowlike tapered ring 8 disposed at the lower edge thereof. The tapered ring 8 has an open end with an inner diameter greater than the outer diameter of the lower portion of the sleeve 5. As a result, when the threaded cap 2 is tightened up, the sleeve 5 is secured to the tapered ring 8 so as to retain securely the pipe 4. In other words, the tapered ring 8 serves as a second means to prevent the fluid from leaking out of the pipe 4. The main body 1 contains a groove 9 disposed in the inner wall thereof. A packing 10 of refractory material is arranged between the groove 9 of main body 1 and the tapered ring 8. As threaded cap 2 is tightened, the pressure exerting on the packing 10 will cause the expansion in volume of the packing 10 so as to prevent the fluid from leaking out of the pipe. FIG. 5 is a sectional view showing the working association of the pipe with the connector of the present invention.

The main body of the connector embodied in the present invention is of T-shaped construction and can be used in the situations where 135° L-shaped pipe, or 90° L-shaped pipe, or a cross pipe, all of which have the same diameter with or the different diameter from both ends of the main body 1. The connecting job can be done with ease and speed and without the incidents such as fluid leaks and disengagement of the connection head from the pipe under high pressure.

What I claim is:

1. A quick pipe connector capable of being quickly connected to a pipe, comprising:
   (a) a main body comprising at least one receiving end for receiving a pipe to be connected thereto, each said receiving end being a through duct having an inner wall surface defining said through duct and an outer wall surface, each said receiving end further having a threaded portion disposed on said outer wall surface, said threaded portion being provided with a protruded shoulder at one end thereof, said main body further comprising a circular groove disposed in said inner wall surface of said receiving end for receiving a ring shaped packing material;
   (b) a threaded cap for threadably engaging with said receiving end of said main body, said threaded cap having an inner wall surface and an outer wall surface, said threaded cap being provided with parallel protruded stripes on said outer wall surface thereof and with a threaded portion disposed in said inner wall surface thereof;
   (c) a rubber washer disposed between said protruded shoulder of said receiving end of said main body and said threaded cap;
   (d) a sleeve for sleeving about said pipe, said sleeve being disposed between said threaded cap and said pipe to provide a tight seal between said threaded cap and said pipe, said sleeve having a threaded inner wall surface, a bowlike curved flange whose outermost diameter being slightly greater than the diameter of said inner wall surface of said threaded cap, and a plurality of axially extending slots to provide contractibility of said sleeve thereby allowing said sleeve to be received by said threaded cap;
   (e) a tapered ring having an first open end and a second open end said second open being closer to said pipe connector and having a greater diameter than said first end, said tapered ring being adapted to fit onto at least a portion of said sleeve; and
   (f) a packing disposed between said tapered ring and said groove in said inner wall surface of said receiving end of said main body whereby during pipe connecting operation, said packing is placed in said groove, said ring and said sleeve are stacked in series on said packing, said pipe, after being inserted therethrough, is securely connected to said main body by tightening said threaded cap against said threaded portion of said receiving end of said body.

2. A pipe connector capable of being joined rapidly according to claim 1, wherein said sleeve comprises at least one trough disposed on the outer wall thereof.

3. A pipe connector capable of being joined rapidly according to claim 1, wherein said packing is made from refractory rubber.

4. A pipe connector capable of being joined rapidly according to claim 1, wherein said main body is of T-shaped construction.

5. A pipe connector capable of being joined rapidly according to claim 1, wherein said main body is of 90° L-shaped construction.

6. A pipe connector capable of being joined rapidly according to claim 1, wherein said main body is of 135° L-shaped construction.

7. A pipe connector capable of being joined rapidly according to claim 1, wherein said main body is of a cylindrical construction.

8. A pipe connector capable of being joined rapidly according to claim 1, wherein said main body is of a cross construction.

9. A pipe connector capable of being joined rapidly according to claim 1, wherein said main body is of 45° L-shaped construction.

10. A pipe connector capable of being joined rapidly according to claim 1, wherein said main body comprises a through duct with both ends having the same diameter.

11. A pipe connector capable of being joined rapidly according to claim 1, wherein said main body comprises a through duct, said duct having two ends of different diameters.

12. A pipe connector capable of being joined rapidly according to claim 1, wherein said rubber washer is made of a material which will change color when said threaded cap is tightened beyond a predetermined extent.

* * * * *